United States Patent Office 3,321,466
Patented May 23, 1967

3,321,466
2-AMINO-4-HALO-CYCLOALK(d)
AZEPINE COMPOUNDS
Francis Johnson, Newton Lower Falls, and Wilmonte A. Nasutavicus, Framingham, Mass., assignors to The Dow Chemical Company, Midland, Mich., a corporation of Delaware
No Drawing. Filed Dec. 30, 1965, Ser. No. 517,807
5 Claims. (Cl. 260—239)

This is a continuation-in-part of our co-pending application Ser. No. 502,468, filed Oct. 22, 1965.

The present invention is directed to an azepine compound of the formula

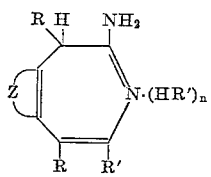

In the above and succeeding formulae, Z represents a straight-chain alkylene radical being of from 2 to 8, both inclusive, carbon atoms; each R independently represents hydrogen, methyl, or halo; each R' represents the same halogen atom; and $n$ represents an integer of from 0 to 1, both inclusive. In the present specification and claims, the terms "halo," "halide," and "halogen" are employed to designate appearances of bromine, chlorine, or iodine, only. The products of the present invention are typically crystalline solid materials.

The products of the present invention are prepared by a cyclization reaction which comprises reacting a dry halogen acid with a substituted 6-carbon-atom dinitrile which is (1) an alkylene substituted 2-hexenedinitrile:

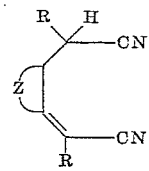

(2) an alkylene substituted 3-hexenedinitrile:

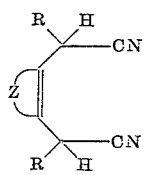

or (3) an α-alkyl-ω-ylidene substituted hexanedinitrile:

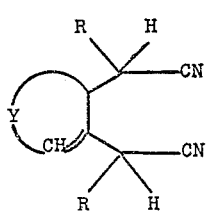

wherein Y is a straight-chain alkylene radical being of from 1 to 7, both inclusive, carbon atoms. This reaction yields azepine compound wherein $n$ represents 1, that is to say, the hydrohalide salt. This salt, upon neutralization, yields the corresponding azepine compound wherein $n$ represents 0, that is to say, free azepine compound. The choice of substituted 6-carbon atom dinitrile is not critical, it being possible to prepare a specific product from the corresponding alkylene substituted 2-hexenedinitrile, the corresponding alkylene substituted 3-hex- enedinitrile, or the corresponding α-alkyl-ω-ylidene substituted hexanedinitrile.

The reaction of halogen acid and substituted 6-carbon-atom dinitrile is preferably carried out in an inert liquid reaction medium, typically an organic liquid. Suitable organic liquids include ethers, such as diethyl ether; hydrocarbons, such as benzene, chlorinated hydrocarbons, such as methylene chloride and chloroform; and the lower alkanoic acids, such as acetic acid and propionic acid.

The reaction goes forward under temperatures of from −50° to +50° C., but is preferably carried out at temperatures of from −5° to +5° C. The atmospheric pressure under which the reaction is conducted is not critical, the reaction going forward under superatmospheric and subatmospheric pressures as well as at atmospheric pressure. However, no advantage pertains to the use of superatmospheric or subatmospheric pressures, and therefore, the reaction is preferably carried out at atmospheric pressure.

The amounts of dry halogen acid and substituted 6-carbon-atom dinitrile employed are not critical, some of the desired product being obtained with any amounts. However, the cyclization of the substituted 6-carbon-atom dinitrile present is incomplete when the halogen acid is present in an amount representing substantially less than two molecular proportions per molecular proportion of substituted 6-carbon-atom dinitrile. Hence, in the practice of the present invention, it is preferred to employ at least two molecular proportions of halogen acid per each molecular proportion of substituted 6-carbon-atom dinitrile. An amount of halogen acid in substantial excess of the two molecular proportions is not detrimental, but affords no advantage.

The cyclization reaction is conveniently carried out by bubbling the dry halogen acid into a solution comprising the substituted 6-carbon-atom dinitrile and an inert liquid reaction medium as previously described. Following this addition of the halogen acid, the reaction mixture can be held for a period of time to complete the reaction. The organic liquid serving as reaction medium is removed from the reaction mixture, typically by evaporation under subatmospheric pressure, to separate the desired product as a syrup or crystalline solid material. The separated product, where $n$ represents one, can be purified in conventional procedures, such as recrystallization.

The neutralization reaction is carried out in conventional manners. For example, azepine compound wherein $n$ represents one can be reacted with sodium bicarbonate to obtain the corresponding free base. The reaction is preferably carried out employing equimolecular proportions of the reactants or an excess of sodium bicarbonate. The reaction is conveniently conducted at room temperature and at atmospheric pressure. Separation and purification are conducted in conventional procedures.

The following examples illustrate the best mode now known for the practice of the present invention and will enable those skilled in the art to practice the present invention.

EXAMPLE 1.—2-AMINO-4-BROMO-6,7,8,9 - TETRAHYDRO - IH - CYCLOHEX(d)AZEPINE HYDROBROMIDE

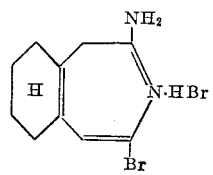

2 - cyclohexene - 1,2 - diacetonitrile (1.3 grams; 0.008 mole) was mixed in about 50 milliliters of a 1:4 mixture of methylene chloride/diethyl ether. The resulting mixture was cooled to a temperature of about 0° C. Thereafter, hydrogen bromide, in the amount of 3 equivalents, was bubbled into the mixture over a period of forty minutes. During the bubbling-in of the hydrogen bromide, the temperature of the reaction mixture was maintained at about 0° C. Thereafter, the solvents were removed from the reaction mixture by evaporation under subatmospheric pressure to obtain the desired 2-amino-4-bromo-6,7,8,9 - tetrahydro-IH-cyclohex(d)azepine hydrobromide product as a white crystalline material. The product, after recrystallization, melted at 221–2° C.

EXAMPLE 2.—2-AMINO-4-BROMO-6,7,8,9 - TETRAHYDRO-IH-CYCLOHEX(d)AZEPINE 3.2 grams of 2-amino-4-bromo-6,7,8,9-tetrahydro-IH-cyclohex(d)azepine hydrobromide was dissolved in about 15 milliliters of methanol and the solution poured with stirring into about 60 milliliters of a saturated aqueous sodium bicarbonate solution. The steps were carried out at room temperature. The resulting reaction mixture was permitted to stand for a period of about 0.5 hour and then filtered to separate the desired free azepine compound, 2-amino-4-bromo-6,7,8,9-tetrahydro-IH-cyclohex-(d)azepine, melting at 160–5° C. Elemental analysis was carried out on a portion of the product and the following results were obtained.

Theoretical: C, 49.8 H, 5.4; B, 33.1; N, 11.6. Found: C, 49.5; H, 5.4; B, 33.0; N, 11.6.

Other representative products of the present invention include the following:

2-amino-4-chloro - 6,7,8,9,10,11,12,13 - octahydro-IH-cyclodec(d) azepine hydrochloride, prepared by bubbling hydrogen chloride into a solution comprising acetic acid and 1-cyclodecene-1,2-diacetonitrile; the product has a molecular weight of 289.3;

2-amino-4-bromo-1,6,7,8 - tetrahydro-IH-cyclopent(d) azepine hydrobromide, melting at 192.5° C.; and the corresponding free base, 2-amino-4-bromo-1,6,7,8-tetrahydro-IH-cyclopent(d)azepine, melting at 153–5° C. prepared respectively (1) by reacting hydrogen bromide with 2-cyclopentene-1,2-diacetonitrile and (2) by subsequent neutralization;

1-chloro-2-amino-4-bromo - 6,7,8,9 - tetrahydro-IH-cyclohex(d)azepine hydrobromide (molecular weight of 356.5), prepared by bubbling hydrogen bromide through a solution comprising methylene chloride and 1-(cyanomethylene)-2-(chlorocyanomethyl)cyclohexane;

2-amino-4-bromo-6,7,8,9,10,11-hexahydro-IH-cyclooct-(d)azepine hydrobromide, melting at 228–230° C., and the corresponding free base, 2-amino-4-bromo-6,7,8,9,10,11-hexahydro-IH-cyclooct(d)azepine, melting at 165–8° C. prepared respectively (1) by reacting hydrogen bromide with 2-cyclooctene-1,2-diacetonitrile and (2) by subsequent neutralization;

1,5-dimethyl-2-amino-4-bromo - 1,6,7,8,9,10,11,12-octahydro-IH-cyclonon(d)azepine hydrobromide, having a molecular weight of 392.2, prepared by bubbling hydrogen bromide into a solution comprising diethyl ether and 1,2-bis(1-cyanoethyl)-1-cyclononene;

2-amino-4-bromo - 1,6,7,8,9,10 - hexahydro-IH-cyclohept(d)azepine hydrobromide, melting at 203–5° C., and the corresponding free base, 2-amino-4-bromo-1,6,7,8,9,10-hexahydro-IH-cyclohept(d)azepine, melting at 170–4° C. prepared respectively (1) by reacting hydrogen bromide with 2-cycloheptene-1,2-diacetonitrile and (2) by subsequent neutralization;

1,5-dibromo-2-amino-4-chloro-6,7 - dihydro-IH-cyclobut(d)azepine hydrochloride (molecular weight of 362.9), prepared by reacting together hydrogen chloride with 1,2-bis(bromocyanomethyl)-1-cyclobutene, and, by neutralization thereof, the corresponding 1,5-dibromo-2-amino-4-chloro-6,7-dihydro-IH-cyclobut(d)azepine (molecular weight of 326.5);

And 2-amino-4-iodo-6,7,8,9 - tetrahydro-IH-cyclohex-(d)azepine hydroiodide (molecular weight of 416.1), prepared by bubbling hydrogen iodide into a solution comprising methylene chloride and 1-cyclohexene-1,2-diacetonitrile.

The products of the present invention are of use as insecticides and give good control of organisms such as house flies and cockroaches.

The alkylene substituted 2-hexenedinitrile starting materials are prepared in known procedures. In these procedures, corresponding 1 - oxo-2-(cyanomethyl)cycloalkane compounds of the formula

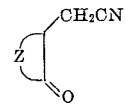

are reacted with diethylcyanomethylphosphonate

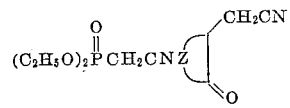

and sodium hydride in 1,2-dimethoxyethane, in the method of Wadsworth et al. (Journal of the American Chemical Society, volume 83 (1961), pages 1733–1738), to obtain the desired alkylene substituted 2-hexenedinitrile starting materials. The 1-oxo-2-(cyanomethyl)cycloalkane compounds are prepared by the method of Bailey et al., Journal of Organic Chemistry, volume 28 (1963), pages 610–614.

We claim:
1. Compound of the formula

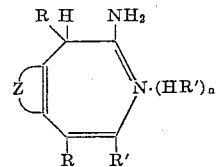

wherein Z represents a straight-chain alkylene radical being of from 2 to 8, both inclusive, carbon atoms; each R independently represents hydrogen, methyl, or halo; each R' represents the same halogen atom; and $n$ represents an integer of from 0 to 1, both inclusive.

2. Compound of claim 1 wherein Z represents trimethylene and each R group is hydrogen.

3. Compound of claim 1 wherein Z represents tetramethylene and each R group is hydrogen.

4. Compound of claim 1 wherein Z represents pentamethylene and each R group is hydrogen.

5. Compound of claim 1 wherein Z represents hexamethylene and each R group is hydrogen.

No references cited.

ALEX MAZEL, *Primary Examiner.*

ALTON D. ROLLINS, *Assistant Examiner.*